Patented Dec. 19, 1944

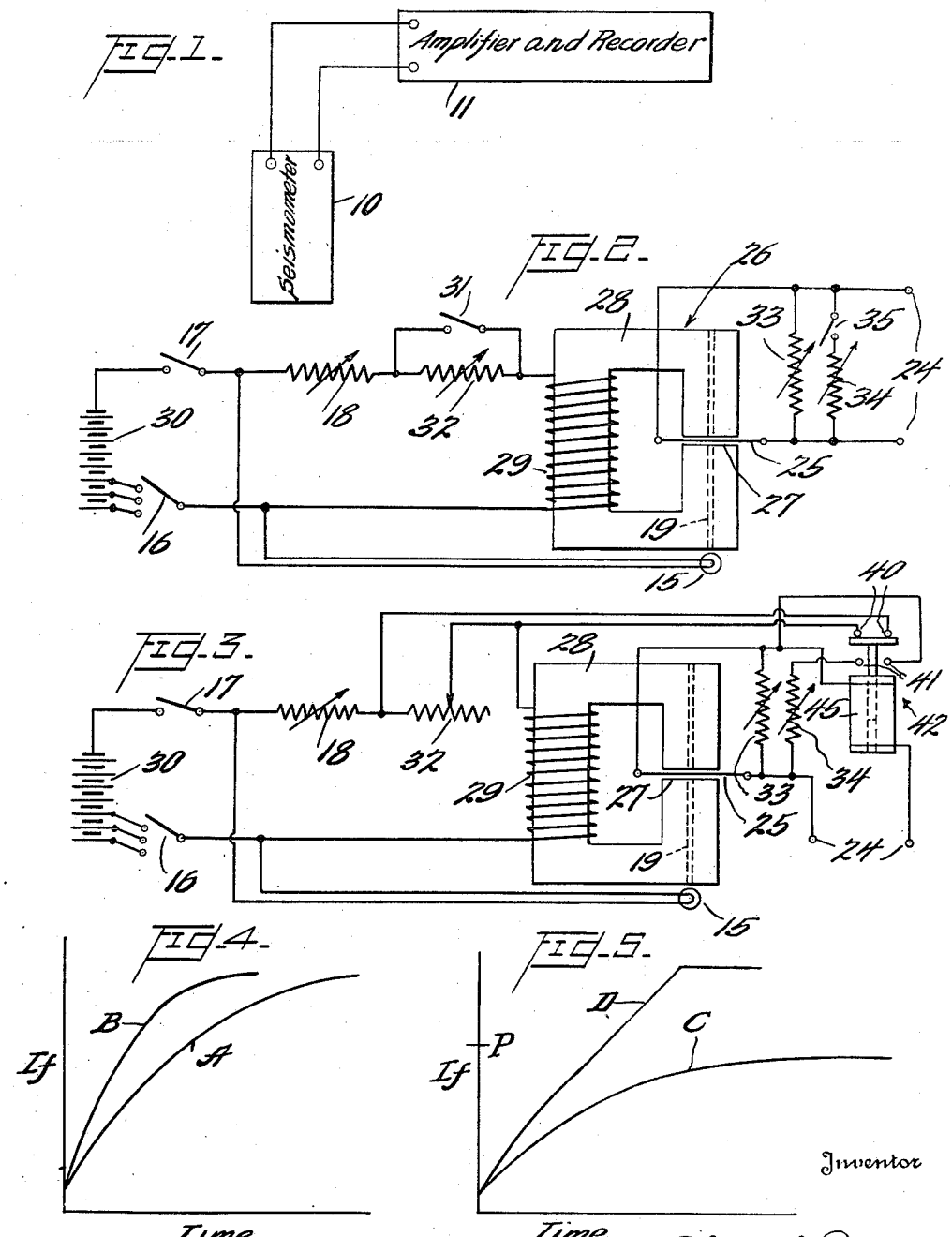

2,365,289

UNITED STATES PATENT OFFICE 2,365,289

SEISMIC SURVEYING

Olive S. Petty, San Antonio, Tex.

Application May 15, 1940, Serial No. 335,389

5 Claims. (Cl. 177—352)

This invention relates to methods of and apparatus for conducting seismic surveys for use in connection with geophysical prospecting, and more particularly to apparatus and methods for amplifying and recording the seismic wave trains as they arrive at a receiving station.

It is a general object of the present invention to provide novel and improved apparatus for and methods of amplifying and recording the arrival times of waves which are received over a period of several seconds and exhibit during that time various intensities or amplitudes, the ratio of the highest to the lowest amplitude being relatively large.

Thus it is well recognized that certain higher energy waves may arrive at the receiving station with an intensity of the order of 600 times as great as certain other waves, and it is also noted that during a period following the reception of waves of high amplitude, the wave form energy is gradually attenuated over an appreciable period, usually decaying rather uniformly with time. Thus in order that waves of widely varying amplitude may all be received and recorded by sensitive apparatus on a record sheet or other medium of convenient dimensions, it is highly essential that some means be provided to bring the waves, or the energy derived therefrom, to levels not greatly differing throughout the total time of wave reception.

With this end in view, it is an object of the instant invention to provide seismic apparatus characterized by a range of sensitivity such that on the reception of wave energy of high amplitude, the level at which such energy is recorded may be maintained within usable limits. It is a further object of the invention to provide means for gradually increasing the level at which the energy is recorded during periods of attenuation or decay of the wave trains.

It is a feature of this invention that the extent to which the sensitivity of the apparatus may be varied, as well as the period during which gradual increase in sensitivity is effected, may be predetermined with reasonable accuracy.

More specifically, it is an object of the invention to provide, in apparatus of the character described and in association with a seismometer or other device for converting seismic waves or impulses into electrical wave form energy, an amplifying and recording device of which the sensitivity may be varied over a wide range and which may be so adjusted that the sensitivity will gradually increase over a definite and predetermined period of time to compensate for attenuation or decay of signals.

In a preferred form of the invention, it is proposed to employ a galvanometer in such a device including a field winding having such self-inductance that the magnetic field established thereby builds up comparatively slowly when the winding is energized. Thus when little or no energizing current is supplied to the winding, the sensitivity of the galvanometer is correspondingly low, and a satisfactory record of high amplitude signals can be obtained. Energization of the field winding following the reception of high amplitude signals effects gradual increase in the sensitivity of the galvanometer during the period of subsequent signal attenuation, so as to maintain the record at a usable level. An adjustable resistance included in series with the field winding, together with means for adjusting the potential applied by the source of energizing current, affords an arrangement whereby the rate at which the field builds up, as well as the ultimate value of the field, can be readily adjusted and predetermined.

Further objects and features of the invention will be apparent from the following description taken in connection with the accompanying drawing, in which Figure 1 is a diagrammatic representation of essential elements of seismic apparatus to which the instant invention may be applied;

Figure 2 is a diagrammatic representation of one method of applying the invention to the apparatus shown in Figure 1;

Figure 3 is a diagrammatic showing corresponding to Figure 2, but illustrating a modification thereof; and Figures 4 and 5 are graphic representations illustrative of the function of the structure shown in Figures 2 and 3.

In order to facilitate an understanding of the invention, reference will be made to the several embodiments thereof illustrated in the accompanying drawings and specific language will be employed. It will nevertheless be understood that various further modifications of the devices illustrated herein, such as would fall within the province of those skilled in the art to construct are contemplated as part of the present invention. This application is a continuation-in-part of my prior application, Serial No. 290,929, filed August 18, 1939.

In Figure 1 is shown diagrammatically the essential elements of apparatus for the reception and recording of seismic impulses, this apparatus including a seismometer 10, whereby the seismic waves or impulses are converted into electrical wave form signals, and amplifying and recording means 11 for the signal output of the seismometer. The association of the illustrated units of the apparatus is conventional, and the nature of these units may vary widely. For example, the seismometer may be constructed as disclosed in either of my prior applications, Serial No. 324,013, filed March 14, 1940, or Serial No. 318,739, filed February 13, 1940. The amplifying and recording unit may be of any conventional type adapted to amplify electrical wave form signals, for example, a thermionic valve amplifier, and to effect a record of the signal energy. The novelty in the instant invention resides in means for imparting to this apparatus a variable sensitivity for the purpose hereinbefore set forth.

Preferably the sensitivity of the receiving apparatus is varied by means associated with the amplifying and recording unit, for example such as is illustrated more particularly in Figure 2 of the drawing. Thus this figure illustrates schematically a string galvanometer, the latter being indicated generally at 26; a galvanometer of the multiple string type is preferably used, although for convenience only one string and the associated circuit is shown. The signal output of the seismometer 10, after suitable preliminary amplification by thermionic valve circuits, not shown, is supplied to the input terminals 24 for the string 25 of the galvanometer. Deflection of the string 25 in response to variation in signal energy is preferably recorded photographically on a suitable chart by means of an optical system of more or less conventional form, the optical system including a lamp or other light source 15 which projects a light beam past the string 25. A strip or sheet of sensitized paper, not shown, is driven at a predetermined linear speed transversely of the optical system, and the shadow cast by the string 25 is recorded thereon. The string 25 is disposed in the small air gap 27 of the soft iron core, or other suitable magnetic material, or field magnet 28 of the galvanometer, a portion of which is wound as at 29 with a suitable field winding adapted to be energized by direct current from a battery or other source 30. Associated with the battery 30 is a voltage control switch 16, or other suitable voltage control means, whereby the potential supplied by the battery may be varied as desired. The lamp 15 is energized from the battery 30 on the closing of a main switch 17, and the light beam is projected through a slot 19 in the magnet pole pieces. In series with the battery 30 and the winding 29 is a variable resistance 18, which may be adjusted to alter the period required to build up the galvanometer field to the maximum value, as hereinafter more fully explained. A second variable resistance 32 is also included in series in the circuit, a switch 31 being arranged in shunt with the resistance 32 for the purpose of shorting the latter.

Arranged in shunt with the galvanometer string 25 are variable resistances 33 and 34, the latter being in series with a manually operable switch 35.

In the operation of the apparatus shown herein, the switch 17 is first closed to energize the lamp 15 so that a shadow of the string 25 is cast on the moving record sheet as hereinbefore explained. The resistance 32 having been initially set to a relatively high value, only a small or negligible current flows in the field winding 29, and the field in which the string 25 vibrates is largely the result of residual magnetism in the core 28, although this initial field may, of course, be increased by manipulation of the resistance 32. When high intensity seismic impulses arrive, the operator, by visual observation of the record sheet watches the amplitude of swing of the galvanometer string 25, and as soon as reduction of amplitude commences, indicating the end of the reception of high intensity energy, he closes the switch 31 to increase the field strength of the galvanometer and opens the switch 35 to permit more energy from the amplifier to reach the galvanometer string.

The time in which the current in the winding 29 and hence the magneto-motive force of the field builds up following the closing of switch 31 is a function of the self-inductance of the winding which is, of course, dependent on the size and number of turns as well as on the shape, size, and magnetic characteristics of the core 28. It is possible to determine initially the self-inductance of the field so as to compensate to a reasonable extent for signal strength attenuation, thus maintaining the trace of the received waves at a usable level. However, the time required to build up the field to the maximum intensity, as well as the value of the ultimate intensity, may readily be varied to meet operating conditions.

Thus, referring to Figure 4, it will be observed that the variation in field current with respect to time following the closing of switch 31 is represented by curves A and B. Curve A represents the rate of increase in the field current, when the resistance 18 has been adjusted to a very small value or to zero; curve B indicates the rate of increase in the field current when the resistance 18 has been adjusted to a higher value. It will be noted that as the resistance 18 is increased (with corresponding increase in the potential applied by source 30) the rate of increase of the field current from the minimum value is correspondingly increased.

It will be appreciated that in order to obtain curves such as are represented at A and B in Figure 4, some adjustment of the potential delivered by the battery 30 may be required in order that the final value of the field current may be the same regardless of the setting of the resistance 18. Thus if the resistance 18 is increased, and it is desired that the ultimate value of the field current shall not be less, the switch 16 must be operated to select an appropriate potential in order to compensate for the voltage drop across the resistance 18.

It will be observed that the curves A and B are of generally logarithmic form; the equation for this type of curve may be expressed as follows:

$$i = \frac{E}{R}\left(1 - \epsilon^{-\frac{R}{L}t}\right)$$

where $i$ is the field current at the end of time $t$ after the closing of the switch 31, E is the voltage applied by the source 30, R is the total D. C. resistance in the circuit, L is the inductance of the field winding 29, and $\epsilon$ is a constant $$\left(\frac{1}{\epsilon} = .362\right)$$

However, the foregoing holds true where flux increases linearly with current only if the ultimate value of the field current is less than that required to saturate the core, and under some circumstances it may be desirable, in order further to vary the time curve, to exceed the saturation point. Thus Figure 5 shows two curves representing increase in field current with time in which curve C, corresponding generally to curve A of Figure 4 represents the increase in field current when the saturation point is not exceeded, and curve D represents the increase of the field current when the current at the saturation point P is considerably less than the ultimate value of the field current. It will be noted that curve D rises much more rapidly after the saturation point is passed, being generally linear. The saturation point may, of course, be established wherever desired by proper selection of the material of which the core is formed. For example, Permalloy or Mumetal; mild steel, and Swedish iron establish saturation points of increasing current magnitude in the order named. Furthermore, by the selection of different materials for the core, as well as by variation of the shape of the pole pieces, the inductance of the field may be varied over a wide range, with consequent variation in the rate of increase of the field current, so that any desired shape of curve can be established in this manner in conjunction with adjustment of the variable resistance 18 and regulation of the applied voltage at the source 30. It may be mentioned that when the saturation point is exceeded, as in curve D of Figure 5, the final magnetic flux in the air gap between the pole pieces is reduced due to leakage of the flux after core saturation is reached.

The arrangement shown in Figure 3, involving a slight modification of the circuit shown in Figure 2, is quite similar to the latter with the exception that the switches 31 and 35 of Figure 2 are replaced by contactors 40 and 41 of a relay indicated generally at 42. The operating winding 45 of this relay is so connected in the signal circuit that when high intensity signals are received, the relay is operated to bridge the contacts 41, thereby shunting the resistance 34 across the string 25 to reduce the current flowing in the string. At the same time, the contacts 40 are opened, so that any current delivered to the winding 29 must flow through the resistance 32 and is thus maintained at a very low level. Immediately following the passage of high amplitude energy, the movable member of the relay is displaced in the opposite direction to bridge the contacts 40, thus shorting out the resistance 32, and applying an increased voltage to the winding 29, with the result hereinbefore indicated. At the same time, the shunting resistance 34 is removed from the circuit by the opening of the contacts 41, so that increased energy is delivered from the amplifier to the string 25. Obviously this arrangement effects no function which could not be performed by the skilled operator through manipulation of the switches 31 and 35 of Figure 2, but renders the device automatically responsive to variation in the incoming signal for establishing a corresponding variation in the sensitivity of the apparatus.

It will be appreciated that the use of a selective shunt resistance 34 across the galvanometer string 25 is merely an adjunct to the principal method of control by establishment of the desired strength of galvanometer field and may, under some conditions, be omitted entirely without materially affecting the result achieved.

It will also be appreciated that the galvanometer may be considered either as part of an amplifying means or as part of a recording means, since it assists in the performance of both functions. Thus the amplitude of swing of the galvanometer string in response to seismic impulses of fixed amplitude may be varied over a wide range in the manner hereinbefore pointed out, the level of the energy output of the system being in effect raised or lowered by variation of the galvanometer field strength. The galvanometer thus functions much in the same manner as a thermionic valve, the energy supplied locally to the valve serving to vary the signal strength and the energy supplied to the galvanometer field serving to vary the mechanical deflection of the string which is representative of the signal strength. On the other hand, the string functions in conjunction with the optical system and sensitized sheet, which constitute, strictly speaking, the recording means, in the making of the record.

Having thus described the invention, what is claimed as new and desired to be secured by Letters Patent is:

1. The method of maintaining substantial uniformity of deflection in a galvanometer having an electromagnetic field wherein the energy responsible for deflection is decreasing at a relatively uniform rate comprising, applying said energy and simultaneously energizing said field and providing said field with such self-inductance that its magnetic field builds up at a rate of the same order as the decrease of the deflecting energy.

2. In a galvanometer of the type provided with a moving element which is displaced in a magnetic field to an extent determined by the current flowing in the moving element, means for applying to said moving element a fluctuating current, the average value of which decreases at a more or less uniform rate over a predetermined period of time, a field winding for establishing said magnetic field, and a direct current source for energizing said winding, the self-inductance of said winding being such that on energization thereof the magneto-motive force of the field builds up at substantially the same rate as the average value of the said fluctuating current decreases, whereby the record from the galvanometer is rendered substantially uniform.

3. Apparatus for making geophysical explorations including in combination a seismophone, a thermionic valve amplifier, a recorder including a galvanometer having a field winding adapted to be electrically energized, means for delivering all of the output of said amplifier to said recorder, means to maintain the said field circuit open during reception of high amplitude wave energy, means to close said circuit prior to reception of decaying wave energy, the self-inductance of said field being such that the magneto-motive-force builds up at a rate comparable with the decrease in amplitude of the wave energy whereby a trace of substantially uniform size is produced.

4. Apparatus for recording seismic waves including in combination a seismometer, an amplifier and a recorder, said recorder including a galvanometer having a field winding, a source of current for energizing said field winding, means for delivering all of the output of the amplifier at a predetermined gain to said recorder, means actuated by a substantial reduction of energy delivered to said recorder to increase the current available to said field winding, the self-inductance of said winding being such that the current flow increases at a rate to compensate for wave attenuation with time.

5. In a recording galvanometer of the type provided with a moving element which is displaced in a magnetic field to an extent determined by the current flowing in the moving element, means for applying to said moving element a fluctuating current, the average value of which decreases at a more or less uniform rate over a predetermined period of time, a field winding for establishing said magnetic field, a direct current source for energizing said winding, the self-inductance of said winding being such that on energization thereof the magneto-motive force of the field builds up at substantially the same rate as the average value of the said fluctuating current decreases, whereby the record from the galvanometer is rendered substantially uniform, and a variable resistance in series with said field winding for adjusting the said rate.

OLIVE S. PETTY.